(12) United States Patent
Tolstov et al.

(10) Patent No.: US 11,372,422 B2
(45) Date of Patent: Jun. 28, 2022

(54) APPARATUS, SYSTEM AND METHOD FOR USING VEHICLE MARKERS FOR CONTROLLING DEVICES

(71) Applicants: VOLKSWAGEN AKTIENGESELLSCHAFT, Wolfsburg (DE); AUDI AG, Ingolstadt (DE); PORSCHE AG, Stuttgart (DE)

(72) Inventors: Oleg Tolstov, San Carlos, CA (US); Liang Kong, Santa Clara, CA (US); Maximilian Thum, Foster City, CA (US)

(73) Assignees: VOLKSWAGEN AKTIENGESELLSCHAFT, Wolfsburg (DE); AUDI AG, Ingolstadt (DE); PORSCHE AG, Stuttgart (DE)

( * ) Notice: Subject to any disclaimer, the term of this patent is extended or adjusted under 35 U.S.C. 154(b) by 437 days.

(21) Appl. No.: 16/721,827

(22) Filed: Dec. 19, 2019

(65) Prior Publication Data
US 2021/0191414 A1 Jun. 24, 2021

(51) Int. Cl.
*G05D 1/02* (2020.01)
*G05D 1/00* (2006.01)
*G06K 7/14* (2006.01)
*G07C 5/00* (2006.01)

(52) U.S. Cl.
CPC ......... *G05D 1/0234* (2013.01); *G05D 1/0088* (2013.01); *G05D 1/0246* (2013.01); *G06K 7/1413* (2013.01); *G06K 7/1417* (2013.01); *G07C 5/008* (2013.01); *G05D 2201/0212* (2013.01); *G05D 2201/0213* (2013.01)

(58) Field of Classification Search
CPC .. G05D 1/0234; G05D 1/0088; G05D 1/0246; G05D 2201/0212; G05D 2201/0213; G06K 7/1413; G06K 7/1417; G07C 5/008
See application file for complete search history.

(56) References Cited

U.S. PATENT DOCUMENTS

| | | | |
|---|---|---|---|
| 7,656,283 B2 | 2/2010 | Kushida et al. |
| 10,192,367 B2 | 1/2019 | Ko et al. |
| 2012/0126000 A1 | 5/2012 | Kunzig et al. |
| 2019/0139308 A1 | 5/2019 | Sun et al. |

*Primary Examiner* — Mathew Franklin Gordon
(74) *Attorney, Agent, or Firm* — Loza & Loza, LLP; Peter Zura

(57) ABSTRACT

Technologies and techniques for determining locations of a plurality of markers on a vehicle in three-dimensional space. The markers may be configured as optical or radio markers, where a sensor determines the locations of each of the plurality of markers, or a shape formed by the markers collectively. The locations of each of the plurality of markers or shape is then compared to a template to determine a match. The match identifies a vehicle having vehicle data that includes locations of vehicle components and/or vehicle performance characteristics. The vehicle data is then used to generate control signals for controlling a control device that may be associated with a robotic apparatus, a vehicle computer system and/or drone operating system.

20 Claims, 9 Drawing Sheets

APPARATUS, SYSTEM AND METHOD FOR USING VEHICLE MARKERS FOR CONTROLLING DEVICES

FIELD OF TECHNOLOGY

The present disclosure is directed to technologies and techniques for processing vehicle marker data. More specifically, the present disclosure is directed to processing vehicle marker data to obtain vehicle data, and to utilize the vehicle data to control a processor-based device.

BACKGROUND

Markers (or "tags"), such as optical markers are known in the art, and are commonly used in industrial and commercial applications. For example, barcodes are a method of representing data in a visual, machine-readable form. Typically, barcodes represent data by varying the widths and spacings of parallel lines. These barcodes, now commonly referred to as linear or one-dimensional (1D), can be scanned by special optical scanners, called barcode readers. Two-dimensional (2D) variants have been developed using geometric patterns, or "matrix codes" or "2D barcodes" that can read or deconstructed using application software on devices with inbuilt cameras, such as smartphones. One commonly-known 2D barcode is a "QR code", which is a machine-readable optical label that contains information about the item to which it is attached. In practice, QR codes often contain data for a locator, identifier, or tracker that points to a website or application. A QR code typically uses four standardized encoding modes (numeric, alphanumeric, byte/binary, and kanji) to store data efficiently.

Other marker types include radio-frequency identification (RFID) markers, which use electromagnetic fields to automatically identify and track tags attached to objects. The tags contain electronically stored information. Passive tags collect energy from a nearby RFID reader's interrogating radio waves. Active tags have a local power source (such as a battery) and may operate hundreds of meters from the RFID reader. Unlike a barcode, the tags don't need to be within the line of sight of the reader, so it may be embedded in a tracked object.

One of the issues with markers is that they suffer from informational and/or operational inefficiencies, which limit their application in industrial, including vehicular, environments. For example, an optical marker, such as a QR code attached to a surface of a vehicle, is able to provide information to an external device regarding a vehicle, but suffers from a number of drawbacks. First, the physical position of a scanner must be sufficiently close in order to scan the code correctly. Also, the nature of the physical code (i.e., the physical pattern of the QR label) requires a relatively high level of precision in order to read out the code with a scanner without error. When applied in a relatively dirty environment, such as the surface of a vehicle used outdoors, QR codes and the like may quickly become unreadable as surface dirt/debris accumulates over the code.

Regarding radio markers, they may also provide information to an external device (e.g., via scanner) regarding a vehicle, but they suffer from drawbacks as well. For one, radio markers are somewhat complex and are identified by the frequency or "wave" that is used, and signal accuracy and distance may be influenced by the frequency of the radio system, the individual radio receiver, the antenna being used, characteristics of the tag, the thickness and material the tag is attached to, how the tag is attached and/or the environment that the system is being used in. Because radio tags are dependent on the data being carried on the radio signal, any disruption and/or abnormality in the radio signal may cause a defective or erroneous reading.

What is needed in the art are technologies and techniques to provide markers for machines, such as automotive vehicles, which are capable of producing accurate means for identifying the machine, with having reduced data requirements. The optical and/or radio markers should be simple to recognize to allow for quick vehicle identification for use in processing devices associated with other machines and/or vehicles.

SUMMARY

Various apparatus, systems and methods are disclosed herein relating to specialized computer systems for health care computer system schedule processing.

In some illustrative embodiments, a system for operating a control device is disclosed, comprising: a processor; communications circuitry, operatively coupled to the processor, wherein the communications circuitry is configured to communicate with a computer network; a memory, operatively coupled to the processor, the memory being configured to store template optical marker data; an optical sensor, operatively coupled to the processor, for receiving optical marker data, wherein the optical marker data comprises data relating to individual ones of a plurality of optical markers, spaced apart from each other in three-dimensional space; a marker processing module, operatively coupled to the processor, for processing the optical marker data to determine locations of each of the plurality of optical markers in the three-dimensional space, (i) wherein the marker processing module is configured to compare the determined locations of each of the plurality of markers with the template optical marker data to determine a match, (ii) wherein the marker processing module is configured to transmit a request signal via the communications circuitry if a match is determined, (iii) wherein the processor is configured to receive and process vehicle data, comprising characteristics of a vehicle, via the communications circuitry in response to the request signal; and a device operation control module, operatively coupled to the processor, wherein the device operation control module is configured to generate one or more control signals based on the processed vehicle data to control the operation of a control device.

In some illustrative embodiments, a system for operating a control device is disclosed, comprising: a processor; communications circuitry, operatively coupled to the processor, wherein the communications circuitry is configured to communicate with a computer network; a memory, operatively coupled to the processor, the memory being configured to store template radio marker data; a radio sensor, operatively coupled to the processor, for receiving radio marker data, wherein the radio marker data comprises data relating to individual ones of a plurality of radio markers, spaced apart from each other in three-dimensional space; a marker processing module, operatively coupled to the processor, for processing the radio marker data to determine locations of each of the plurality of radio markers in the three-dimensional space, (i) wherein the marker processing module is configured to compare the determined locations of each of the plurality of radio markers with the template radio marker data to determine a match, (ii) wherein the marker processing module is configured to transmit a request signal via the communications circuitry if a match is determined, (iii) wherein the processor is configured to receive and process vehicle data, comprising characteristics of a vehicle, via the communications circuitry in response to the request signal; and a device operation control module, operatively coupled to the processor, wherein the device operation control module is configured to generate one or more control signals based on the processed vehicle data to control the operation of a control device.

In some illustrative embodiments, a method for operating a control device is disclosed, comprising: storing, in a memory, template optical marker data; receiving, via an optical sensor, optical marker data, wherein the optical marker data comprises data relating to individual ones of a plurality of markers, spaced apart from each other in three-dimensional space; processing, via a marker processing module, the optical marker data to determine locations of each of the plurality of optical markers in the three-dimensional space; comparing, via the marker processing module, the determined locations of each of the plurality of markers with the template optical marker data to determine a match; transmitting, via communications circuitry, a request signal if a match is determined; receiving and processing, via a processor, vehicle data comprising characteristics of a vehicle in response to the request signal; and generating via a device operation control module, one or more control signals based on the processed vehicle data to control the operation of a control device.

BRIEF DESCRIPTION OF THE FIGURES

The present invention is illustrated by way of example and not limitation in the figures of the accompanying drawings, in which like references indicate similar elements and in which.

DETAILED DESCRIPTION

Various embodiments will be described herein below with reference to the accompanying drawings. In the following description, well-known functions or constructions are not described in detail since they may obscure the invention in unnecessary detail.

It will be understood that the structural and algorithmic embodiments as used herein does not limit the functionality to particular structures or algorithms, but may include any number of software and/or hardware components. In general, a computer program product in accordance with one embodiment comprises a tangible computer usable medium (e.g., hard drive, standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via C, C++, C#, Java, Actionscript, Swift, Objective-C, Javascript, CSS, XML, etc.). Furthermore, the term "information" as used herein is to be understood as meaning digital information and/or digital data, and that the term "information" and "data" are to be interpreted as synonymous.

Figure 1A:
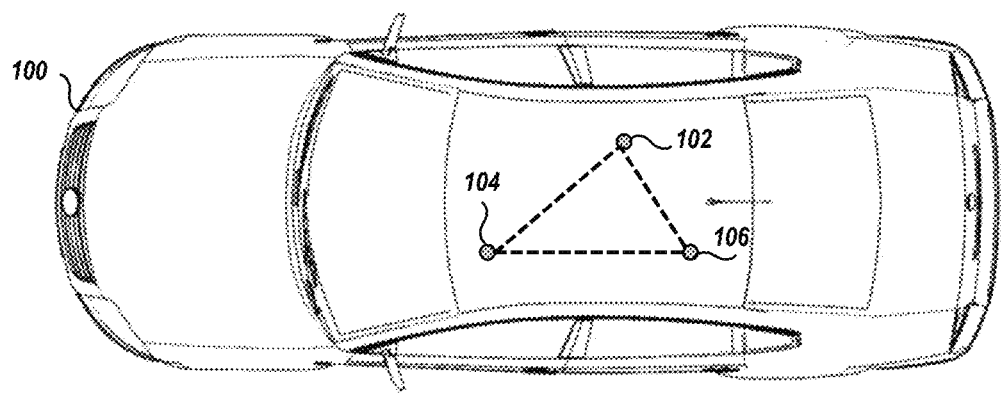
FIGS. 1A-1C show marker placements for the top of a vehicle, including the roof, the hood and the trunk, under various illustrative embodiments.
Figure 1B:
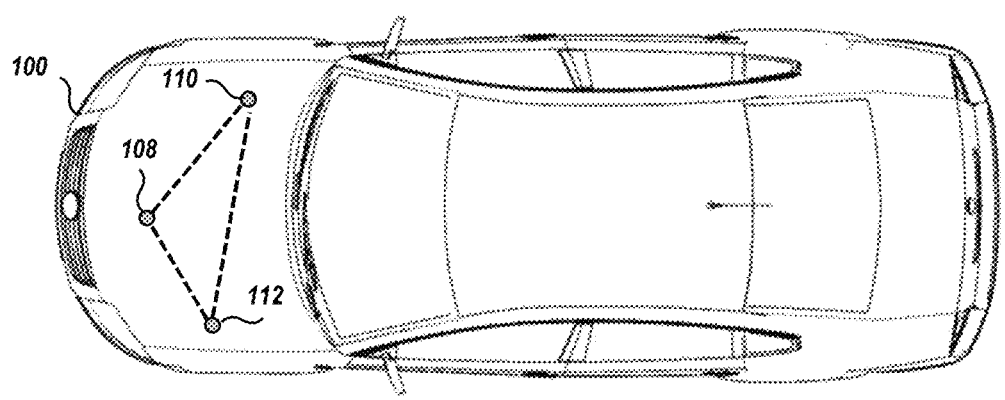
Figure 1C:
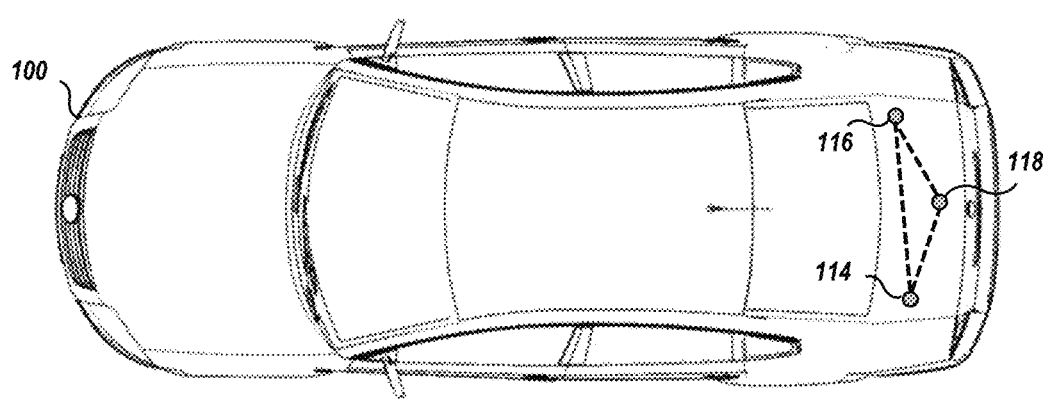

Turning to FIGS. 1A-1C, the figures show various marker placements for a vehicle 100 under illustrative embodiments. In some illustrative embodiments, the markers (e.g., 102-118) may be optical markers and/or radio markers. When configured as optical markers, they may be configured as active or passive markers. Active markers may be light emitting elements (e.g., infrared), such as LEDs. Active markers may be configured to emit radiation when one or more tracking cameras (e.g., 208, 210) are active, and may be synchronized to the cameras. Synchronization may be done via a wired connection between a tracking system (e.g., 200A) and the electronics controlling the active markers, but is preferably done via wireless means. For wireless synchronization, a coded light flash (e.g., IR flash) may be transmitted by a tracking camera. The active markers' electronics will recognize the coded flash and activate the LEDs. The lighting configuration may include single LEDs which can produce visibility for longer distances within a wide (e.g., 60 degrees or more) angular range of visibility. The lighting configuration may also include diffusers for optimizing angular range of visibility at limited distances. The lighting configuration may also include several single LEDs arranged on a flat surface that may also be covered with a light scattering surface, which can provide tracking at greater distances, within an angular range of visibility less than 180°.

Passive markers may be configured to be retroreflective. In the case of IR light, the passive marker reflects incoming IR radiation into the direction of the incoming light. More specifically, the IR radiation may be back-reflected into a narrow range of angles around the source of the incoming light. These markers may be objects covered in retroreflecting foils, and can also be stickers made from retroreflecting material. The retroreflecting sheets or foils can be based on a plurality of different optical principles, for example, as three mirrors, arranged in 90° angles to each other, to reflect light in a predetermined way. In some illustrative embodiments, foils with arrangements of a plurality of very small mirrors in a plane may be used. Another optical principle may include glass balls having an appropriate refraction index to focus incoming light onto the opposite surface of the ball. A layer of microscopic glass balls, carried by a reflecting material, can act as a retro reflector. These foils can be fabricated on a flexible carrier material, thus may be advantageous to use on curved surfaces to produce markers with retroreflecting surfaces.

In some illustrative embodiments, the markers may be placed in virtually any portion of a vehicle body (or even inside a vehicle), provided the markers collectively form a geometric shape. Preferably, at least three markers are used to form the geometric shape. As can be seen in the example of FIG. 1A, markers 102, 104 and 106 are positioned on the roof of vehicle 100. The markers 102-106 may be used collectively to serve as identifiers for the vehicle 100. Depending on the specific recognition algorithm used, markers 102-106 may identify vehicle 100 based on relative distances among each of the marker, e.g., the distance between marker 102 and 104, together with the distance between marker 104 and 106, as well as marker 106 and 102. In some illustrative embodiments, the identification may also include the relative positions of each marker 102-106. In some illustrative embodiments, the volume of the geometric shape formed by markers 102-106 may also be used.

FIG. 1B shows an example where the markers 108-112 are positioned on the hood of the vehicle 100, and the markers 108-112 may be configured similarly to those described above in connection with FIG. 1A. FIG. 1C similarly shows markers 114-118 on the trunk of the vehicle 100, where markers 114-118 may also be configured similarly to those described above in connection with FIG. 1A. Those having skill in the art will recognize that there is wide latitude for placing markers on vehicle 100, and markers may be placed on practically any surface (including the undercarriage), depending on the configuration/application used for the marker recognition system (e.g., 200A, 200B). Also, combinations of radio and optical markers are contemplated in the present disclosure.

Figure 2A:
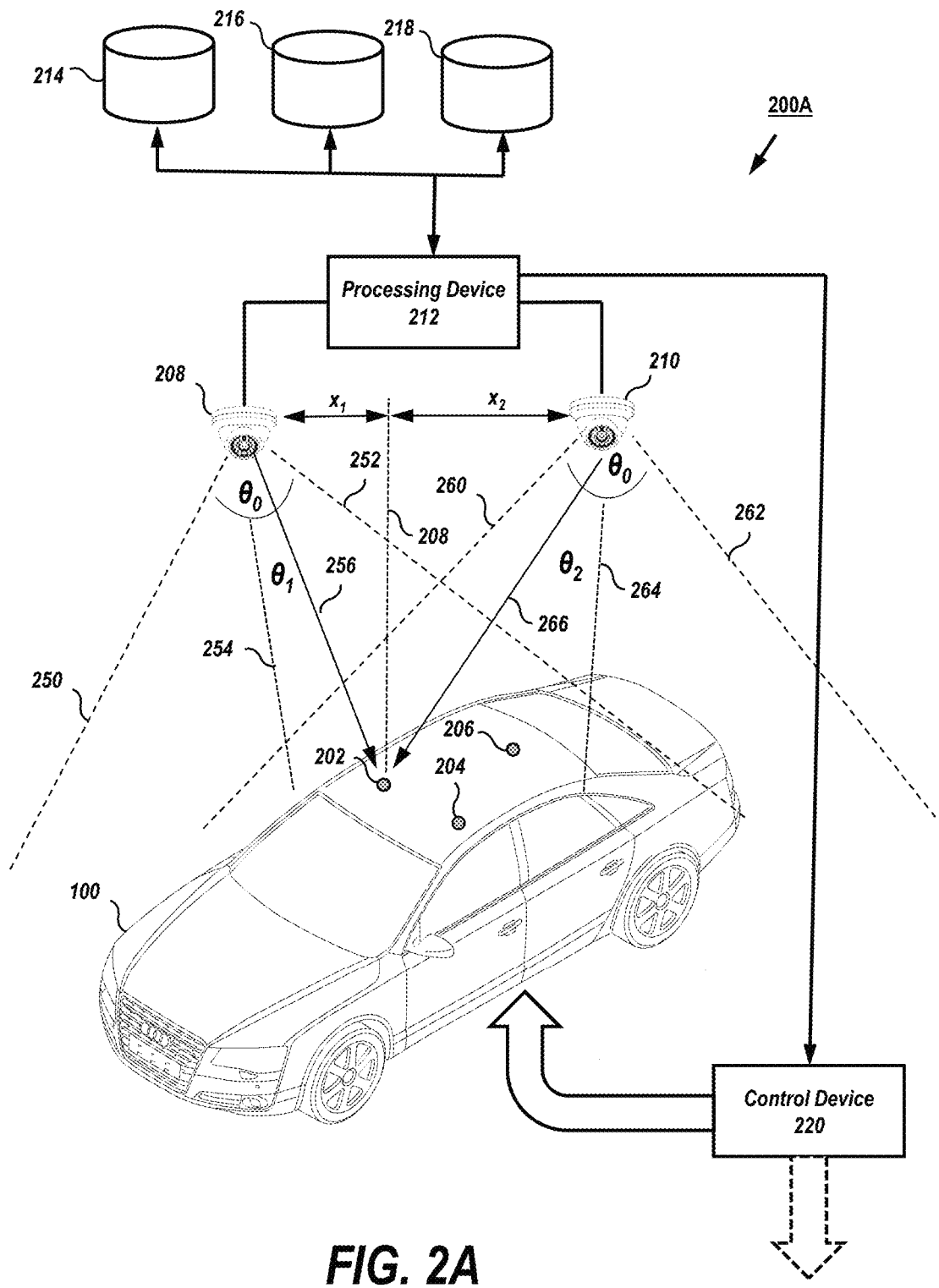
FIG. 2A shows a system for reading optical markers, such as those in the embodiments of FIGS. 1A-1C and processing the marker data to produce vehicle identification data used for controlling a control device under an illustrative embodiment.

FIG. 2A shows a system 200A for reading optical markers (202-206), such as those in the embodiments of FIGS. 1A-1C, and processing the marker data to produce vehicle identification data used for controlling a control device (e.g., 220) under an illustrative embodiment. In this example, vehicle 100 is configured with three optical markers 202-206 and stops or passes or stops under a structure that includes cameras 208, 210 operatively coupled to processing device 212. While two cameras are illustrated in this example, those skilled in the art should understand that fewer or greater numbers of cameras may be utilized. Additionally, a single multi-lens camera may also be utilized. Each of cameras 208, 210 are preferably positioned to have an overlapping field of view, shown as dotted lines in the figure. In some illustrative embodiments, each of the cameras 208, 210 may be equipped with their own light source, which would also illuminate in the direction of vehicle 100. In some illustrative embodiments, one or more separate light sources (not shown) may be equipped in the vicinity of vehicle 100.

In some illustrative embodiments, cameras 208, 210 detect the position and/or placement of markers 202-206 via processing device 212. The unique placement of markers 202-206 for each vehicle type may collectively serve as an identification marker for each vehicle. Thus, to generate a new vehicle type identification marker, one or more of the markers 202-206 would be physically located in a different placement. When the cameras 208-210 detect this new placement via processing device 212, a new vehicle type is identified. Thus, different combinations of marker placements may uniquely identify a particular car, model, make, year, and so forth. After processing the optical marker data to establish a vehicle identification, the processing device 212 may access one or more databases 214-218 containing vehicle data associated with the vehicle identification. The vehicle data may include, but is not limited to, physical characteristics of the vehicle, including locations of vehicle components (e.g., charging port, fuel tank filler, windshield, tires, etc.), as well as performance characteristics of the vehicle. The one or more databases 214-218 may be operatively coupled directly to processing device 212, or may alternately or an addition be coupled to processing device 212 via a wired or wireless network (e.g., 350)

Once the vehicle data is obtained, the processing device 212 may process the vehicle data to generate one or more control signals that are transmitted to control device 220, which, in turn, performs an action on vehicle 100 (shown as curved arrow) and/or may transmit signals (shown as dotted arrow) to perform other actions external to vehicle 100. In some illustrative embodiments, control device 220 may be configured to receive vehicle data from processing device 212 and generate control signals alternately or in addition to processing device 212. Those skilled in the art should recognize that the control signals may be applied in a wide area of operating environments.

In one example, the control device 220 and/or processing device 212 may be embodied as portions of an automated car fueling/charging system, where the vehicle data is used to generate control signals to physically position a robotic arm configured to charge or fuel a vehicle (e.g., 100). In another example, the control device 220 and/or processing device 212 may be embodied as portions of an automated car maintenance system, where the vehicle data is used to generate control signals to physically position a robotic arm configured to remove and/or change tires on a vehicle (e.g., 100). In still another example, the control device 220 and/or processing device 212 may be embodied as portions of an autonomous and/or semi-autonomous vehicle system (e.g., in vehicle 100), where the vehicle data (from another vehicle) is used to identify one or more positions of a neighboring vehicle and generate control signals to adjust driving parameters in the vehicle to control vehicle distance, speed, etc. In this example, the vehicle (e.g., 100) may additionally transmit the vehicle data and/or control signals to neighboring vehicles in a platoon configuration to collectively adjust driving parameters among the plurality of vehicles. In yet another example, the control device 220 and/or processing device 212 may be embodied as portions of drone operating system, where the vehicle data is used to generate control signals for the drone to identify and execute a landing on a physical landing spot on the vehicle, based on the vehicle data.

Techniques for measuring the location and distance to the markers (202-206) can be accomplished utilizing active methods, which measure the distances by sending some signals to the marker (e.g. laser beam, radio signals, ultrasound, etc.), or passive methods, which only receive information about a marker's position (e.g., by light). In the example of FIG. 2A, stereoscopic measuring techniques are used with cameras 208-210, where each marker distance and/or position may be calculated from relative differences of each marker position on both cameras. Each camera 208, 210 may be configured to have a predetermined angle of view $\theta_0$, defined by lines 250-252 for camera 208, and lines 260-262 for camera 210. Using marker 202 as an example, camera 208 has a view line 256 to marker 202, which is offset by angle $\theta_1$ from the center line of sight 254. Similarly, camera 210 has a view line 266 to marker 202, which is offset by angle $\theta_2$ from the center line of sight 264.

The distance X between cameras may be defined by $x_1+x_2$, which may be expressed in terms of $X=D \tan \theta_1 + D \tan \theta_2$, where D is the distance of the marker 202 position (208). This expression assumes the optical axes of the cameras are parallel, and $\theta_1$ and $\theta_2$ are angles between an optical axis of the camera lens and the chosen marker. As such, the distance D may be determined by $$D = \frac{X}{\tan \theta_1 + \tan \theta_2}$$

Assuming each camera 208, 210 has a picture resolution of $r_0$ (i.e., the span between 250-252 for camera 208, and 260-262 for camera 210), the horizontal distance for the marker 202 may be expressed as $-c_1$ for camera 208, where $-c_1$ represents the leftward (relative to the camera) offset distance from the center line of sight 254 and marker 202. Similarly, the horizontal distance for the marker 202 may be expressed as $c_2$ for camera 210, where $c_2$ represents the rightward (relative to the camera) offset distance from the center line of sight 264 and marker 202. As each center line of sight (254, 264) bisects the picture resolution $r_0$ in each camera viewing field, the left or right area in which the marker 202 appears would be designated as $r_0/2$. Thus, for camera 208, $$\frac{-c_1}{\frac{r_0}{2}} = \frac{\tan \theta_1}{\tan\left(\frac{\theta_0}{2}\right)}$$

and $$\frac{c_2}{\frac{r_0}{2}} = \frac{\tan \theta_2}{\tan\left(\frac{\theta_0}{2}\right)}$$

Accordingly, distance D can be calculated as $$D = \frac{X r_0}{2\tan\left(\frac{\theta_0}{2}\right)(x_{c1} - x_{c2})}$$

Where the distance between the cameras is X, the number of horizontal pixels are $r_0$, the viewing angle of the camera is $\theta_0$ and the horizontal difference between the same marker on both pictures is $(x_{c1}-x_{c2})$. The accuracy may then be determined using several variables, where, for example, each pixel of the images may correspond to an angle of view. Here, a difference ratio may be determined from a camera's horizontal angle of view divided by the picture resolution in pixels.

Other techniques may be used for marker recognition. For example, after the image data is acquired, image segmentation may be performed to determine marker positions and a computer vision algorithm, based on multiple view geometry may be executed to perform correspondence finding, 3-D reconstruction, model fitting, reconstruction of orientation and position of tracking markers. If needed, prediction filtering for motion data prediction and filtering may be performed to generate a marker position output. Those skilled in the art will recognize that, depending on the application, still further optical marker detection, location and tracking techniques may be utilized under the present disclosure.

Figure 2B:
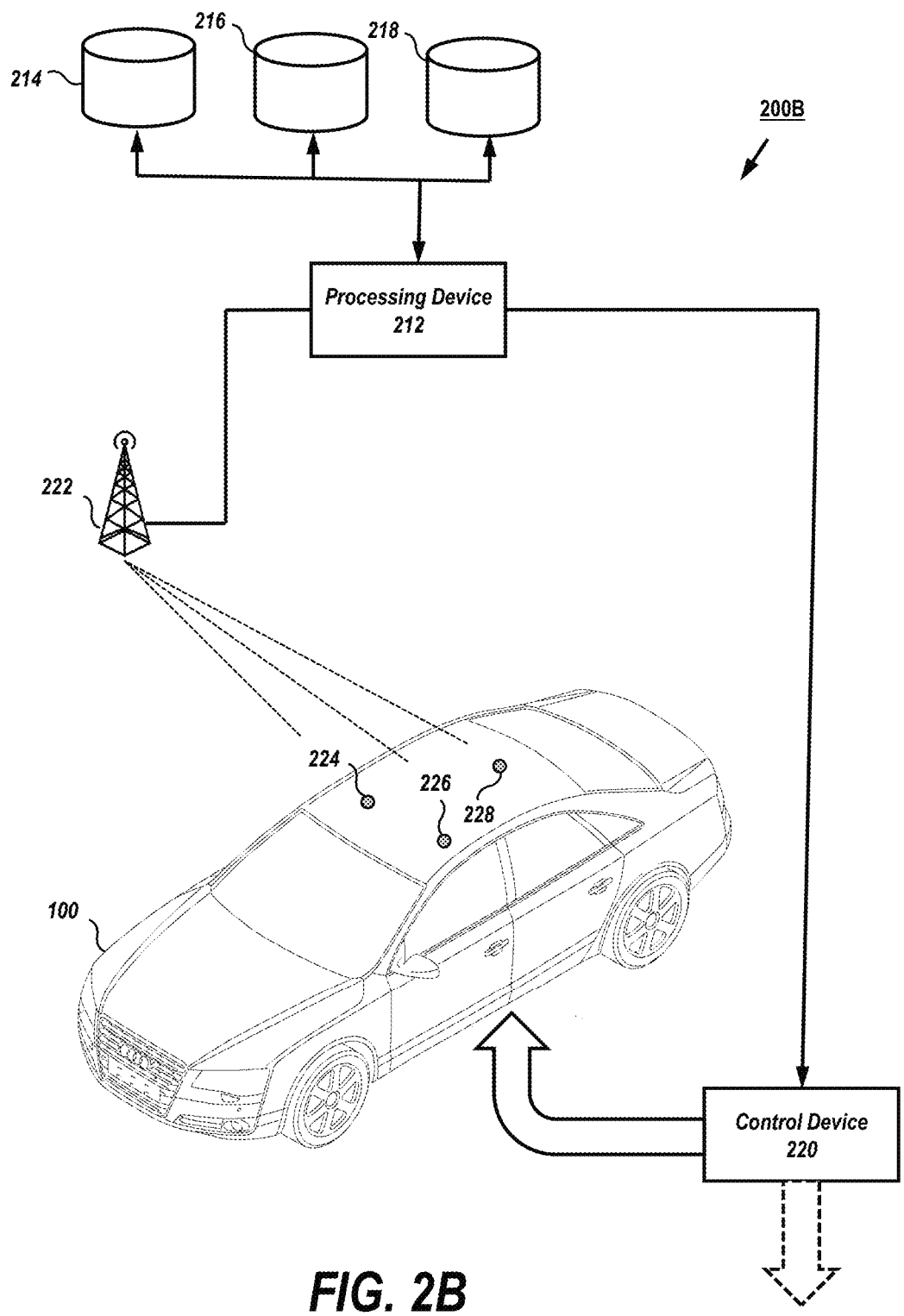
FIG. 2B shows a system for reading radio markers, such as those in the embodiments of FIGS. 1A-1C and processing the marker data to produce vehicle identification data used for controlling a control device under an illustrative embodiment.

Turning to FIG. 2B, a system 200B for reading radio markers (224-228), such as those in the embodiments of FIGS. 1A-1C, and processing the marker data to produce vehicle identification data used for controlling a control device (e.g., 220) under an illustrative embodiment. The system 200B of FIG. 2B is substantially similar to that disclosed above in connection with system 200A of FIG. 2A, except that the markers 224-228 are radio markers instead of optical markers 202-206. Furthermore, instead of using cameras 208-210, system 200B utilizes one or more antennas 222 for detecting wireless transmission from markers 224-228. While only one antenna (222) is illustrated in FIG. 2B, those skilled in the art will recognize that a plurality of antennas, and/or a multi-antenna array may be utilized, depending on the specific application. In some illustrative embodiments, radio waves, magnetic fields, and/or acoustic signals may be used for transmission from markers 224-228, and processing device 212 may be configured to perform behavioral analytics on the received signals to determine marker (224-228) positions. If radio waves are used, the radio waves may be based on platforms, such as Wi-Fi/Li-Fi, Bluetooth beacons, ultra-wideband (UWB) beacons, magnetic positioning and/or dead reckoning, depending on the application. Preferably, the platform used should achieve position accuracy of 2-20 cm or better.

In order to achieve marker positions in system 200B, a variety of different positioning metrics may be used. In one example, received signal strength (RSS), also known as received signal strength indicator (RSSI) may be used to determine marker position/location. RSSI may be derived in the intermediate frequency (IF) stage before an IF amplifier. In zero-IF systems, it is derived in the baseband signal chain, before the baseband amplifier. RSSI output may be a DC analog level. It can also be sampled by an internal analog-to-digital converter (ADC) and the resulting codes available directly or via peripheral or internal processor bus (e.g., via processing device 212). Marker distance may be determined by using a number of signal propagation models, including, but not limited to, free space path loss model, irregular terrain model (ITM), international telecommunication union (ITU) family of models, log-normal or log-distance model, two ray ground reflection (two-ray) mode, and three-ray ground reflection (three-ray) models. In some illustrative embodiments, using RSSI and a path-loss propagation model, the distance between a marker and an antenna-receiver may be determined from $RSSI=-10n \log 10 (d)+A$, where n is the path loss exponent, and A is the RSSI at a reference range from the receiver. To compensate for signal attenuation, filters and/or averaging mechanisms may be used. A suitable localization algorithm (e.g., triangulation, proximity approach, fingerprinting) is then used in processing device 212. In some illustrative embodiments, in configurations using platforms such as UWB and the like, channel state information may be used and subcarrier-level channel measurements may be taken for orthogonal frequency division multiplexing to stabilize measurements and improve positioning accuracy In some illustrative embodiments, RSSI fingerprinting may be used to locate each of the markers 224-228, where a radio map is generated in processing device 212 based on the RSSI data from access points and a probability distribution of RSSI values for a given (x,y) location may be determined. Live RSSI values may then be compared to a pre-stored fingerprint to find the closest match and generate a predicted (x,y) location. Different localization algorithms (depending on the application) may then be used to locate each of the markers 224-228. For example, kNN algorithms may be used if marker distances are adopted as weights in the signal space, based on the RSSI-utilized root mean square error. IN another example, neural network algorithms may be used, where the neural network is trained on RSS values that compare live RSS values with stored coordinates. A perceptron multilayer network (multilayer perceptions) with a hidden node layer may be used to improve accuracy. Other algorithms, such as support vector machines, may also be utilized.

As with the example in FIG. 2A, the system 200B of FIG. 2B may detect the position/distance of each of the markers 224-228, where the collective group position serves as an identification marker for the vehicle 100. To generate a new vehicle type identification marker, one or more of the markers 224-228 would be physically located in a different placement. When the antenna(s) 222 detect this new placement via processing device 212, a new vehicle type is identified. Thus, different combinations of radio marker placements may uniquely identify a particular car, model, make, year, and so forth. After processing the radio marker data to establish a vehicle identification, the processing device 212 may access one or more databases 214-218 containing vehicle data associated with the vehicle identification. The vehicle data may include, but is not limited to, physical characteristics of the vehicle, including locations of vehicle components (e.g., charging port, fuel tank filler, windshield, tires, etc.), as well as performance characteristics of the vehicle. The one or more databases 214-218 may be operatively coupled directly to processing device 212, or may alternately or an addition be coupled to processing device 212 via a wired or wireless network (e.g., 350)

Once the vehicle data is obtained, the processing device 212 may process the vehicle data to generate one or more control signals that are transmitted to control device 220, which, in turn, performs an action on vehicle 100 (shown as curved arrow) and/or may transmit signals (shown as dotted arrow) to perform other actions external to vehicle 100. In some illustrative embodiments, control device 220 may be configured to receive vehicle data from processing device 212 and generate control signals alternately or in addition to processing device 212. Those skilled in the art should recognize that the control signals may be applied in a wide area of operating environments.

Figure 3:
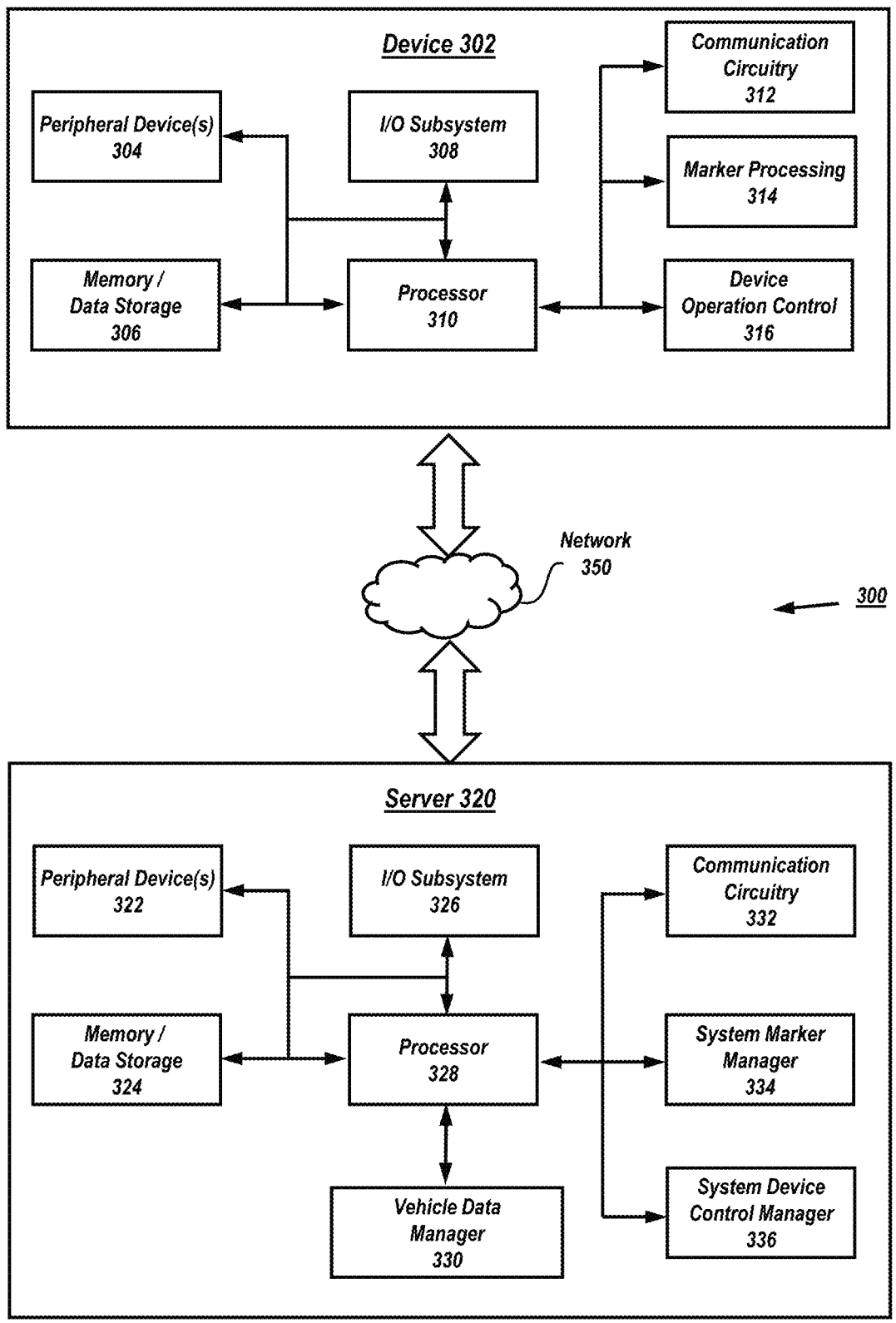
FIG. 3 shows an operating environment for a device and a server for processing marker data for control device operation under an illustrative embodiment.

FIG. 3 shows an operating environment 300 for a device 302 and a server 320 for processing marker data for control device operation under an illustrative embodiment. Operating environment 300 includes a processing device 302, which may be configured as processing device 212, or, alternately or in addition, incorporated into the electronics of vehicle 100. Operating environment 300 may also include a server 320, which may be configured as server 214-218, communicating via the network 350 wherein the operating environment 300 is configured to process marker data and/or vehicle data as described herein. In the illustrative embodiment, the processing device 302 includes a processor 310 or processor circuit, one or more peripheral devices 304, memory/data storage 306, communication circuitry 312, input/output (I/O) subsystem, a marker processing module 314 and control device operation module 316.

Device operation control module 316 of environment 300 may be configured to receive and process vehicle data (e.g., via 214-218) to generate and/or modify control signals for a device (e.g., 220), as discussed herein. Marker processing module 314 may be configured to process optical and/or radio marker data to identify one or more marker patterns representing a vehicle identification. In some illustrative embodiments, marker processing module 314 and/or device operation control module 316 may be incorporated into memory/data storage 306 with or without a secure memory area, or may be a dedicated component, or incorporated into the processor 310. Of course, processing device 302 may include other or additional components, such as those commonly found in a digital apparatus and/or computer (e.g., sensors, various input/output devices), in other embodiments. Additionally, in some embodiments, one or more of the illustrative components may be incorporated in, or otherwise form a portion of, another component. For example, the memory/data storage 306, or portions thereof, may be incorporated in the processor 310 in some embodiments.

The processor 310 may be embodied as any type of processor currently known or developed in the future and capable of performing the functions described herein. For example, the processor 310 may be embodied as a single or multi-core processor(s), digital signal processor, microcontroller, or other processor or processing/controlling circuit. Similarly, memory/data storage 306 may be embodied as any type of volatile or non-volatile memory or data storage currently known or developed in the future and capable of performing the functions described herein. In operation, memory/data storage 306 may store various data and software used during operation of the processor 310 such as access permissions, access parameter data, operating systems, applications, programs, libraries, and drivers.

Memory/data storage 306 may be communicatively coupled to the processor 310 via an I/O subsystem 308, which may be embodied as circuitry and/or components to facilitate input/output operations with the processor 310, memory/data storage 306, and other components of the processing device 302. For example, the I/O subsystem 308 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 308 may form a portion of a system-on-a-chip (SoC) and be incorporated, along with the processor 310, memory/data storage 306, and other components of the processing device 302, on a single integrated circuit chip.

The processing device 302 includes communication circuitry 312 (communication interface) that may include any number of devices and circuitry for enabling communications between processing device 302 and one or more other external electronic devices and/or systems. Similarly, peripheral devices 304 may include any number of additional input/output devices, interface devices, and/or other peripheral devices. The peripheral devices 304 may also include a display, along with associated graphics circuitry and, in some embodiments, may further include a keyboard, a mouse, audio processing circuitry (including, e.g., amplification circuitry and one or more speakers), and/or other input/output devices, interface devices, and/or peripheral devices.

The server 320 may be embodied as any suitable server (e.g., a web server, cloud server, etc.) or similar computing device capable of performing the functions described herein. In the illustrative embodiment of FIG. 3 the server 320 includes a processor 328, an I/O subsystem 326, a memory/data storage 324, communication circuitry 332, and one or more peripheral devices 322. Components of the server 320 may be similar to the corresponding components of the processing device 302, the description of which is applicable to the corresponding components of server 320 and is not repeated herein for the purposes of brevity.

The communication circuitry 332 of the server 320 may include any number of devices and circuitry for enabling communications between the server 320 and the processing device 302. In some embodiments, the server 320 may also include one or more peripheral devices 322. Such peripheral devices 322 may include any number of additional input/output devices, sensors, interface devices, and/or other peripheral devices commonly associated with a server or computing device. In some illustrative embodiments, the server 320 also includes vehicle data manager 330, system marker manager 334 and system device control manager 336. System marker manager 334 may be configured to process marker data received from sensors (e.g., 208-210; 222) to identify a marker configuration. In one example, system marker manager 334 may be configured to operate in conjunction with marker processing module 314, where each module may share data and/or processing responsibilities with the other. In another example, system marker manager 334 receives the raw marker data from marker processing module 314 and performs the processing solely within module 334. In another example, all of the marker processing is performed in marker processing module 314, and system marker identification is forwarded to system marker manager 334. In some embodiments, system marker manager 334 may be connected to a plurality of marker processing modules in a plurality of devices.

Once marker processing is performed, one or more marker characteristics are determined (e.g., via 314, 334). Continuing with the examples discussed above, the marker characteristics may comprise marker placement and/or distance for each of the plurality of markers, calculated using any of the techniques discussed above. In some illustrative embodiments, a collective marker characteristic (e.g., average/median distance of all the markers) may additionally be used to provide additional accuracy. For example, if the markers are misaligned during scanning (e.g., via 208-210; 222), such as when a vehicle may pull into a charging station at an angle, errors may be introduced that may not provide an accurate identification. However, if the marker placement/distance is within a threshold margin of error, the collective marker characteristic may be used to confirm identity of the vehicle.

Once the vehicle identification is established, the identification may be forwarded to vehicle data manager module 330 that may be configured to load (e.g., via 214-218) and/or process vehicle data associated with the vehicle identification. The vehicle data may include data relating physical characteristics of the vehicle, including locations and/or dimensions of vehicle components (e.g., charging port, fuel tank filler, roof, windshield, tires, etc.), as well as performance characteristics of the vehicle (e.g., horsepower, autonomous/semi-autonomous capabilities, etc.). Once the vehicle data is received and/or processed, the vehicle data manager 330 may transmit the data to system device control manager 336, which may process the vehicle data to establish one or more control signals for a control device (e.g., 220) to control operation. For example, assuming that device module 302 is part of an automatic charging station, when vehicle data from vehicle data manager 330 is received, system device control manager module 336 may process the data to determine control signals that would cause device 302 to activate and engage a charging plug to automatically engage to a charging port of a vehicle (e.g., 100). As the vehicle information would indicate the location of a charging port, the control signals from system device control manager module 336 to device operation control module 316 would specify the direction, distance and/or range of motion required to engage the charging port. In some illustrative embodiments, the vehicle data from vehicle data manager 330 may be directly transmitted to device operation control module 316 for similar processing. In some illustrative embodiments, the functions and feature of server 320 and device 302 may be combined into a single, self-contained unit.

In some illustrative embodiments, the platform of operating environment 300 may be based on a Visual Studio (C#.Net) and SQL Server software environment and may utilize predictive algorithms (e.g., genetic algorithm) to optimize the data. Other languages, such as C, C++, C++/CLI, Visual Basic.NET, C#, F#, JavaScript, TypeScript, XML, XSLT, HTML, and CSS, as well as Python, Ruby, Node.js, M, and other suitable programs may be utilized as well, depending on the specific application.

Continuing with the illustrated embodiment of FIG. 3, communication between the server 320 and the processing device 302 takes place via the network 350 that may be operatively coupled to one or more network switches (not shown). In one embodiment, the network 350 may represent a wired and/or wireless network and may be or include, for example, a local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). Generally, the communication circuitry of processing device 302 and the communication circuitry 332 of the server 320 may be configured to use any one or more, or combination, of communication protocols to communicate with each other such as, for example, a wired network communication protocol (e.g., TCP/IP), a wireless network communication protocol (e.g., Wi-Fi, WiMAX), a cellular communication protocol (e.g., Wideband Code Division Multiple Access (W-CDMA)), and/or other communication protocols. As such, the network 350 may include any number of additional devices, such as additional computers, routers, and switches, to facilitate communications between the processing device 302 and the server 320.

Figure 4:
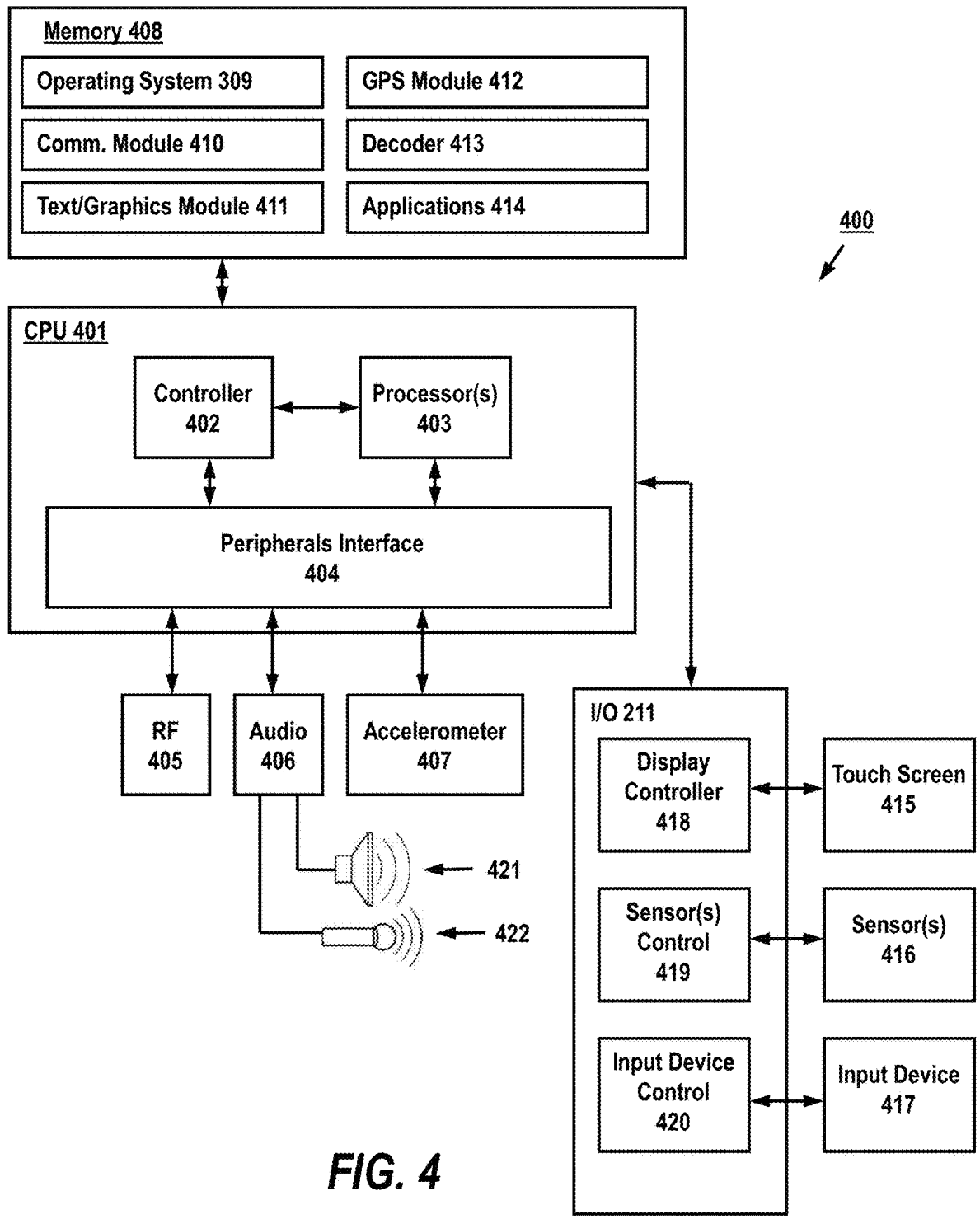
FIG. 4 schematically illustrates an operating environment for a processing device configured to processing marker data and/or provide control device operation under an illustrative embodiment.

FIG. 4 is an exemplary embodiment of a computing device 400 that may be utilized in processor-based devices such as processing device 212, utilized as part of control device 220, and/or integrated as part of vehicle electronics (e.g., vehicle 100). Device 400 may include a central processing unit (CPU) 401 (which may include one or more computer readable storage mediums), a memory controller 402, one or more processors 403, a peripherals interface 404, RF circuitry 405, audio circuitry 406, accelerometer 407, speaker 421, microphone 422, and input/output (I/O) subsystem 221 having display controller 418, control circuitry for one or more sensors 419 and input device control 420. These components may communicate over one or more communication buses or signal lines in device 400. It should be appreciated that device 400 is only one example of a portable multifunction device, and that device 400 may have more or fewer components than shown, may combine two or more components, or a may have a different configuration or arrangement of the components. The various components shown in FIG. 4 may be implemented in hardware or a combination of hardware and software, including one or more signal processing and/or application specific integrated circuits.

Memory (or storage) 408 may include high-speed random access memory (RAM) and may also include non-volatile memory, such as one or more magnetic disk storage devices, flash memory devices, or other non-volatile solid-state memory devices. Access to memory 408 by other components of the device 400, such as processor 403, and peripherals interface 404, may be controlled by the memory controller 402. Peripherals interface 404 couples the input and output peripherals of the device to the processor 403 and memory 408. The one or more processors 403 run or execute various software programs and/or sets of instructions stored in memory 408 to perform various functions for the device 400 and to process data. In some embodiments, the peripherals interface 404, processor(s) 403, decoder 413 and memory controller 402 may be implemented on a single chip, such as a chip 401. In other embodiments, they may be implemented on separate chips.

RF (radio frequency) circuitry 405 receives and sends RF signals, also known as electromagnetic signals. The RF circuitry 405 converts electrical signals to/from electromagnetic signals and communicates with communications networks and other communications devices via the electromagnetic signals. The RF circuitry 405 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 405 may communicate with networks (e.g., 350) an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

Audio circuitry 406, speaker 421, and microphone 422 provide an audio interface between a user and the device 400. Audio circuitry 406 may receive audio data from the peripherals interface 404, converts the audio data to an electrical signal, and transmits the electrical signal to speaker 421. The speaker 421 converts the electrical signal to human-audible sound waves. Audio circuitry 406 also receives electrical signals converted by the microphone 421 from sound waves, which may include utterances from a speaker. The audio circuitry 406 converts the electrical signal to audio data and transmits the audio data to the peripherals interface 404 for processing. Audio data may be retrieved from and/or transmitted to memory 408 and/or the RF circuitry 405 by peripherals interface 404. In some embodiments, audio circuitry 406 also includes a headset jack for providing an interface between the audio circuitry 406 and removable audio input/output peripherals, such as output-only headphones or a headset with both output (e.g., a headphone for one or both ears) and input (e.g., a microphone).

I/O subsystem 221 couples input/output peripherals on the device 400, such as touch screen 415, sensors 416 and other input/control devices 417, to the peripherals interface 404. The I/O subsystem 221 may include a display controller 418, sensor controllers 419, and one or more input controllers 420 for other input or control devices. The one or more input controllers 420 receive/send electrical signals from/to other input or control devices 417. The other input/control devices 417 may include physical buttons (e.g., push buttons, rocker buttons, etc.), dials, slider switches, joysticks, click wheels, and so forth. In some alternate embodiments, input controller(s) 420 may be coupled to any (or none) of the following: a keyboard, infrared port, USB port, and a pointer device such as a mouse, an up/down button for volume control of the speaker 421 and/or the microphone 422. Touch screen 415 may also be used to implement virtual or soft buttons and one or more soft keyboards.

Touch screen 415 provides an input interface and an output interface between the device and a user. Display controller 418 receives and/or sends electrical signals from/ to the touch screen 415. Touch screen 415 displays visual output to the user. The visual output may include graphics, text, icons, video, and any combination thereof. In some embodiments, some or all of the visual output may correspond to user-interface objects. Touch screen 415 has a touch-sensitive surface, sensor or set of sensors that accepts input from the user based on haptic and/or tactile contact. Touch screen 415 and display controller 418 (along with any associated modules and/or sets of instructions in memory 408) detect contact (and any movement or breaking of the contact) on the touch screen 415 and converts the detected contact into interaction with user-interface objects (e.g., one or more soft keys, icons, web pages or images) that are displayed on the touch screen. In an exemplary embodiment, a point of contact between a touch screen 415 and the user corresponds to a finger of the user. Touch screen 215 may use LCD (liquid crystal display) technology, or LPD (light emitting polymer display) technology, although other display technologies may be used in other embodiments. Touch screen 415 and display controller 418 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 415.

Device 400 may also include one or more sensors 416. Sensors 416 may include, but are not limited to, sensors, such as optical sensors that comprise charge-coupled device (CCD) or complementary metal-oxide semiconductor (CMOS) phototransistors, proximity sensors, radio sensors, and the like. The optical sensor may capture still images or video, where the sensor may be operated in conjunction with touch screen display 415. Device 400 may also include one or more accelerometers 407, which may be operatively coupled to peripherals interface 404. Alternately, the accelerometer 407 may be coupled to an input controller 420 in the I/O subsystem 221. The accelerometer is preferably configured to output accelerometer data in the x, y, and z axes.

In some illustrative embodiments, the software components stored in memory 408 may include an operating system 409, a communication module 410, a text/graphics module 411, a Global Positioning System (GPS) module 412, decoder 413 and applications 414. Operating system 409 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components. Communication module 410 facilitates communication with other devices over one or more external ports and also includes various software components for handling data received by the RF circuitry 405. An external port (e.g., Universal Serial Bus (USB), Firewire, etc.) may be provided and adapted for coupling directly to other devices or indirectly over a network (e.g., the Internet, wireless LAN, etc.).

Text/graphics module 411 includes various known software components for rendering and displaying graphics on the touch screen 415, including components for changing the intensity of graphics that are displayed. As used herein, the term "graphics" includes any object that can be displayed to a user, including without limitation text, web pages, icons (such as user-interface objects including soft keys), digital images, videos, animations and the like. Additionally, soft keyboards may be provided for entering text in various applications requiring text input. GPS module 412 determines the location of the device and provides this information for use in various applications. Applications 414 may include various modules, including resource learning logic, profile agent module, sensor software, navigation software, mapping, address books/contact list, email, instant messaging, and the like. In some illustrative embodiments, Applications 414 may communicate with sensors 416, configured as a biometric capture device.

Figure 5:
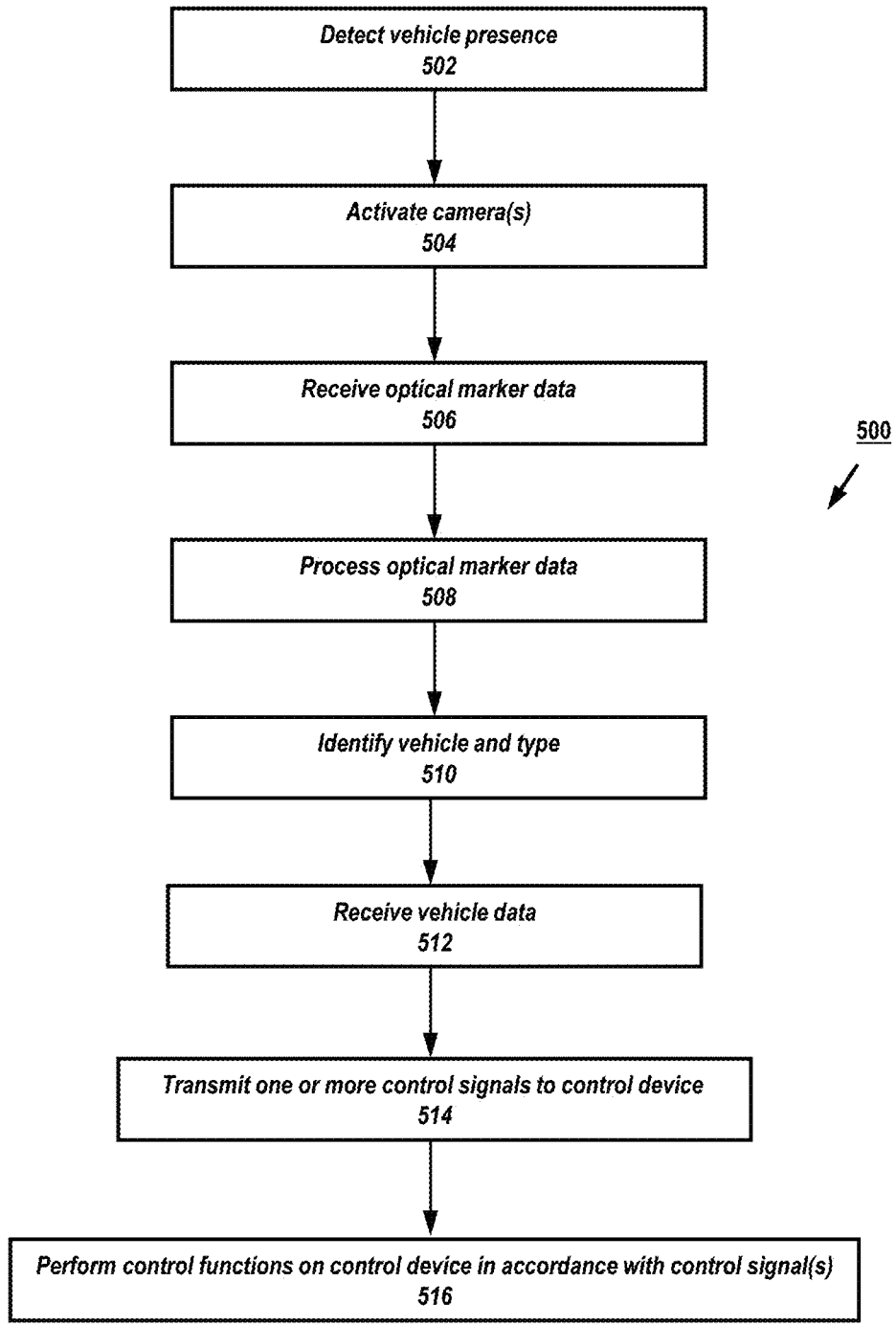
FIG. 5 shows a simplified process for receiving and processing optical marker data to identify a vehicle and type, where one or more control signals are transmitted to a control device for performing a control function under an illustrative embodiment.

Turning to FIG. 5, the figure shows a simplified process 500 for receiving and processing optical marker data to identify a vehicle and type, where one or more control signals are transmitted to a control device (e.g., 220) for performing a control function under an illustrative embodiment. In this example, a processing device (e.g. 212) detects a vehicle presence in block 502. The presence detection may be done utilizing sensors, sensor pads, switches, or other suitable technologies known in the art. In response to detecting a vehicle presence, system cameras (e.g., 208. 210) are activated in block 504 to scan the vehicle body. In block 506, the camera (e.g., 208, 210) receives optical marker data, where the received optical marker data is processed (e.g., via 212) in block 508 to determine marker locations and/or orientation to determine the collective marker geometry. In block 510, the processed marker data is then compared to a database (e.g., via 306, 324, 214-218) to identify the vehicle and type (e.g., manufacturer, make, model, year, etc.). In block 512, the processing device (e.g., 212) receives the vehicle data, and based on this data, transmits one or more control signals to a control device (e.g., 220) in block 514. In block 514 one or more control signals are transmitted to a control device (e.g., 220), where in block 516, the control device performs control functions in accordance with the received control signals (e.g., moving robotic arm for a charger, modifying operating parameters of autonomous vehicle, etc.).

Figure 6:
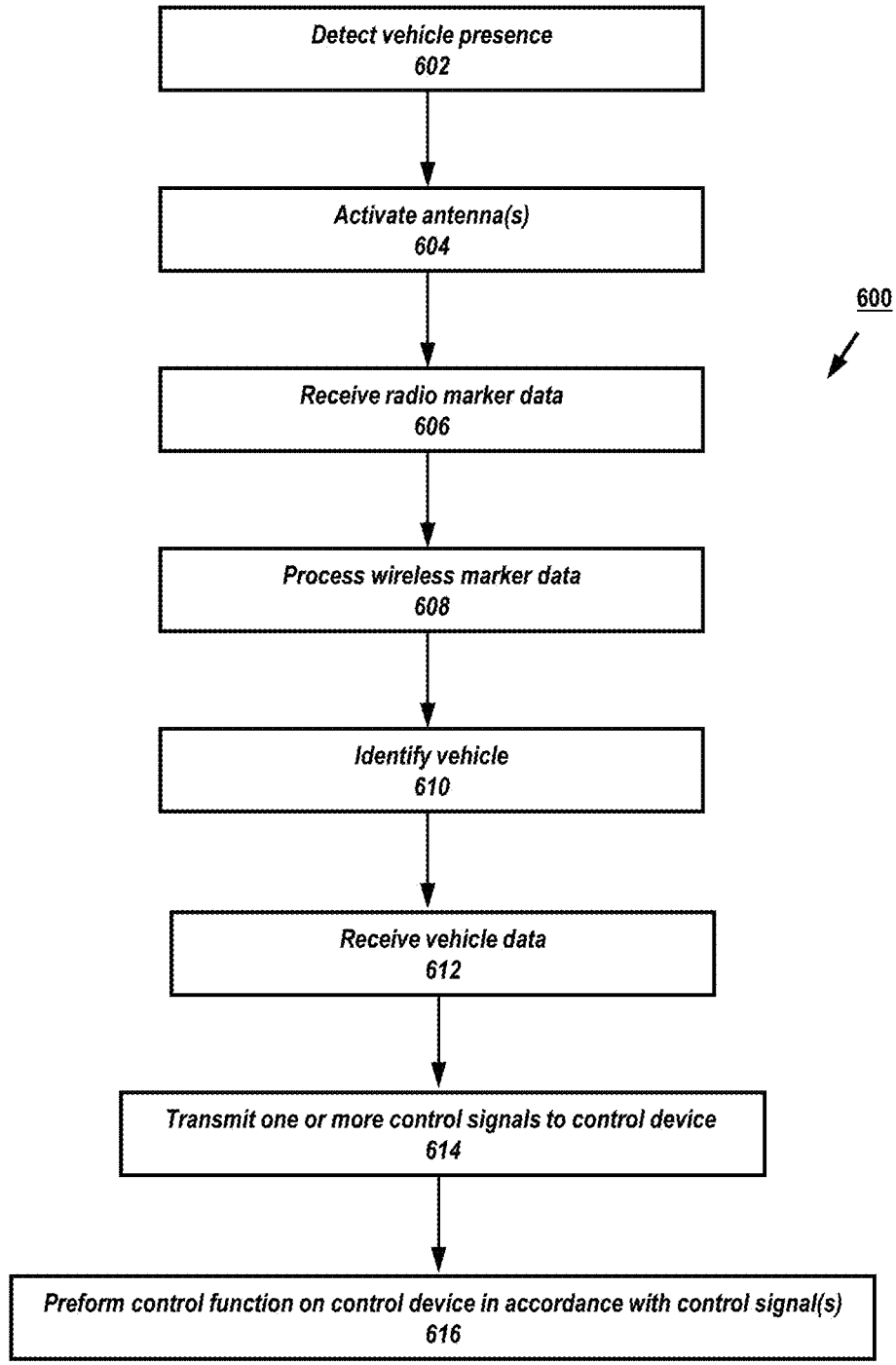
FIG. 6 shows a simplified process for receiving and processing radio marker data to identify a vehicle and type, where one or more control signals are transmitted to a control device for performing a control function under an illustrative embodiment.

FIG. 6 shows a simplified process 600 for receiving and processing radio marker data to identify a vehicle and type, where one or more control signals are transmitted to a control device (e.g., 220) for performing a control function under an illustrative embodiment. In this example, a processing device (e.g. 212) detects a vehicle presence in block 602. The presence detection may be done utilizing sensors, sensor pads, switches, or other suitable technologies known in the art. In response to detecting a vehicle presence, one or more antennas (e.g., 222) are activated or enabled in block 604 to detect transmissions from the radio markers on one or more predetermined frequencies. In block 606, the one or more antennas (e.g., 222) receive radio marker data, where the received radio marker data is processed (e.g., via 212) in block 608 to determine marker locations and/or orientation to determine the collective marker geometry. In block 610, the processed marker data is then compared to a database (e.g., via 306, 324, 214-218) to identify the vehicle and type (e.g., manufacturer, make, model, year, etc.). In block 612, the processing device (e.g., 212) receives the vehicle data, and based on this data, transmits one or more control signals to a control device (e.g., 220) in block 614. In block 614 one or more control signals are transmitted to a control device (e.g., 220), where in block 616, the control device performs control functions in accordance with the received control signals (e.g., moving robotic arm for a charger, modifying operating parameters of autonomous vehicle, etc.).

Figure 7:
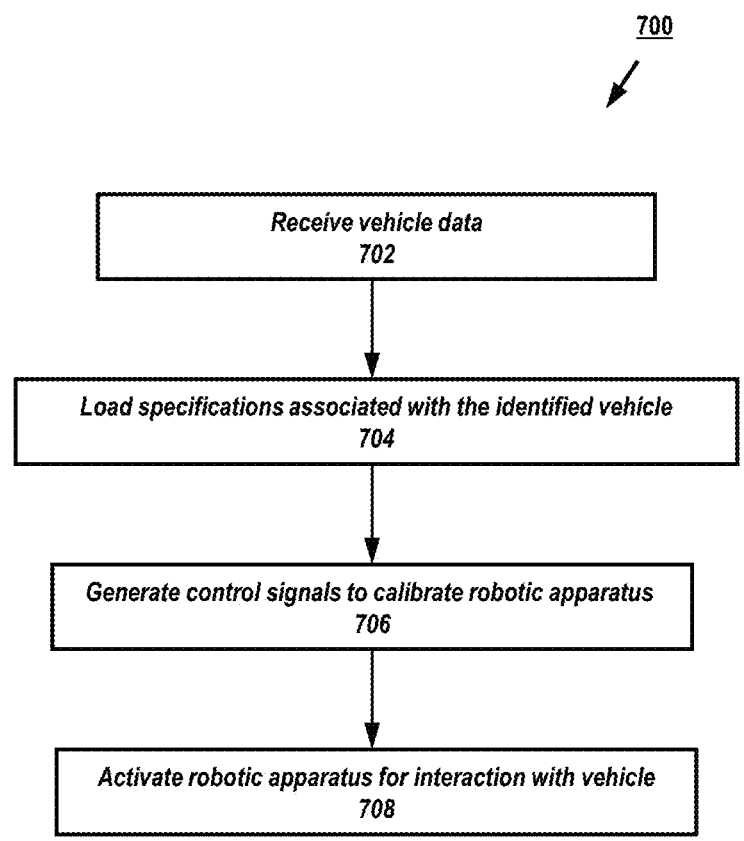
FIG. 7 shows a simplified process for receiving vehicle data, loading specifications associated with the received vehicle data, calibrating a robotic apparatus according to the specification and activating the robotic apparatus for interaction with the vehicle under an illustrative embodiment.

FIG. 7 shows a simplified process 700 for receiving vehicle data, loading specifications associated with the received vehicle data, calibrate a robotic apparatus according to the specification and activate a robotic apparatus having a control device (e.g., 220) for interaction with the vehicle under an illustrative embodiment. Such a configuration may be advantageous when applying the technologies and techniques discussed herein, for example, to an automated robotic vehicle charger. As discussed above, when the marker data (e.g., optical, radio) is processed, the marker geometry is determined from each of the plurality of marker locations, which may also include individual and/or collective marker distances from the optical or radio receiver (e.g., 208-210, 222). The marker geometry may be determined using the individual marker locations, and algorithmically connecting the plurality of markers in the processing device (e.g., 212) to form the geometric shape. This shape may then be compared against a database of pre-stored shapes (templates) using pattern matching, or, preferably, geometric matching, to determine if there is a match.

In some illustrative embodiments, the geometric marker shape may be determined by the processing device (e.g., 212) using the individual marker locations in three-dimensional space. In some illustrative embodiments, the geometric marker shape may be determined by algorithmically connecting the plurality of markers detected in three-dimensional space, and then transforming the connected markers to a two-dimensional shape. Techniques using Extended Gaussian Images, Spherical Attribute Images, Harmonic Shape Images, Spin Images, or any other suitable algorithm may be used for three-dimensional processing. Techniques such as Fourier descriptors, turning functions, circular autoregressive models, height functions, size functions, and other suitable algorithms may be used for two-dimensional processing.

When the received geometric shapes are compared to a template, a match will be found when the comparison produces a match probability that meets or exceeds a predetermined threshold. Once matched, a vehicle identification is determined and the vehicle data identifying the manufacturer, make, model, year, etc. is received in block 702. The vehicle identification may be used to search a relational or non-relational database to retrieve and load specifications associated with the identified vehicle in block 704. In some illustrative embodiments, the vehicle specifications may be configured as partial lists that are specific to a processing device (e.g., 212) so that excess and/or unnecessary specification information does not have to be transmitted. In some illustrative embodiments, the processing device (e.g., 212) requesting the vehicle specifications may transmit an identification code, where only portions of the vehicle specification that are authorized by the identification code are transmitted back.

Once loaded, the vehicle specification data is loaded in block 704, the specification data is used to generate control signals to calibrate a robotic apparatus having a control device (e.g., 220) in block 706. The calibration of the robotic apparatus of block 706 results in the robotic apparatus being programmed to move in one or more directions at one or more distances during operation. Once calibrated the robotic apparatus is activated for interface with the vehicle in block 708. The calibration of block 706 ensures that the robotic apparatus moves into a desired position relative to the vehicle.

Figure 8:
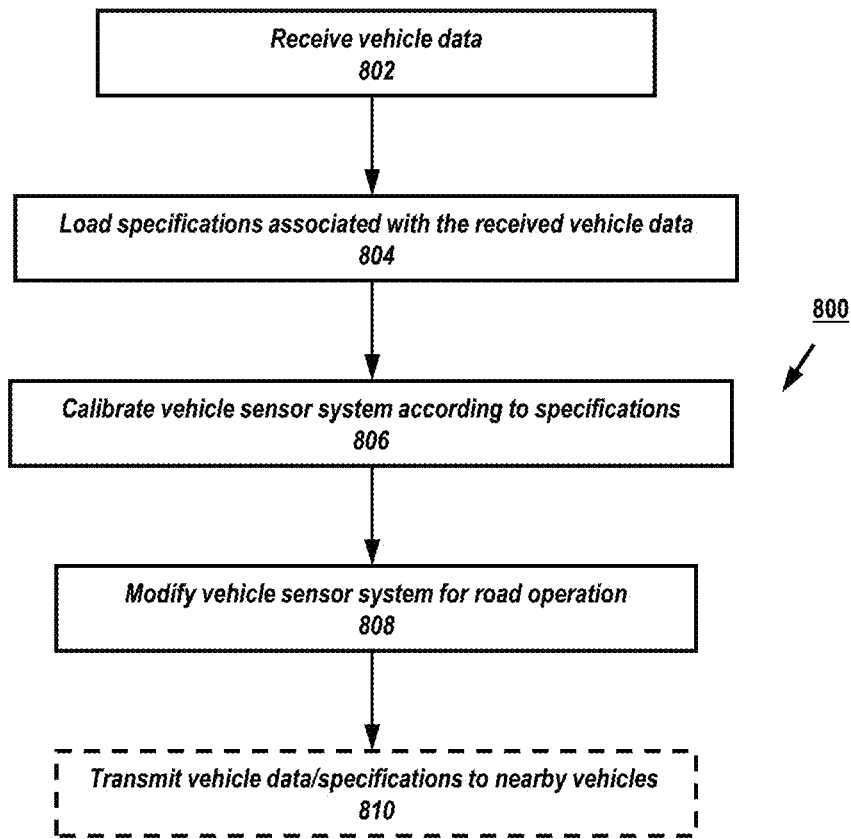
FIG. 8 shows a simplified process for receiving vehicle data, loading specifications associated with the received vehicle data, calibrating a vehicle sensor system according to the specification and modifying a vehicle sensor system for road operation under an illustrative embodiment.

FIG. 8 shows a simplified process 800 for receiving vehicle data, loading specification associated with the received vehicle data, calibrating a vehicle sensor system according to the specification and modifying a vehicle sensor system for road operation under an illustrative embodiment. The example of FIG. 8 may be advantageous when applying the technologies and techniques discussed herein, for example, to an autonomous and/or semi-autonomous vehicle computer system. In this example, after a match is found, the vehicle data is received in block 802, and the vehicle specifications associated with the received vehicle data is loaded in block 804, similar to the embodiment of FIG. 7, discussed above.

Here, instead of controlling a robotic apparatus, the specification data is used to generate control signals to calibrate a vehicle sensor system having a control device (e.g., 220) in block 806. The calibration of the vehicle sensor system results in the vehicle (e.g., 100) modifying one or more sensor parameters using on-board processing to change a driving characteristic of the vehicle in block 808. For example, a vehicle having a forward-facing camera or antenna, may scan a vehicle in front to detect and identify markers. In this example, the markers may identify a heavy vehicle or truck having specifications indicating that the vehicle has slower braking capabilities from normal vehicles. Accordingly, the control device (e.g., 220) in the vehicle may generate control signals based on the specifications that modify the autonomous and/or semiautonomous settings to drive at a greater distance from the identified vehicle. In some illustrative embodiments, if the vehicle is part of an autonomous or semi-autonomous vehicle platoon, the vehicle receiving the specifications from detecting the markers may transmit the vehicle data/specifications to nearby vehicles in block 810, where those neighboring vehicles may make similar modifications to their driving settings. Such a configuration may advantageously allow multiple vehicles to adjust and/or optimize driving settings based on a single scan.

Those skilled in the art will appreciate that the present disclosure provides technologies and techniques for identifying vehicles in a simple yet elegant manner, which allows the identification to allow a control device to operate in a manner that is specific to the identified vehicle. Such features are particularly advantageous in applications where the vehicle interacts with robotic devices and/or when autonomous and/or semi-autonomous vehicles interact with each other.

The figures and descriptions provided herein may have been simplified to illustrate aspects that are relevant for a clear understanding of the herein described devices, structures, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

The disclosed embodiments may be implemented, in some cases, in hardware, firmware, software, or any tangibly-embodied combination thereof. The disclosed embodiments may also be implemented as instructions carried by or stored on one or more non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for operating a control device comprising:
   a processor;
   communications circuitry, operatively coupled to the processor, wherein the communications circuitry is configured to communicate with a computer network;
   a memory, operatively coupled to the processor, the memory being configured to store template optical marker data;
   an optical sensor, operatively coupled to the processor, for receiving optical marker data, wherein the optical marker data comprises data relating to individual ones of a plurality of optical markers, spaced apart from each other in three-dimensional space;
   a marker processing module, operatively coupled to the processor, for processing the optical marker data to determine locations of each of the plurality of optical markers in the three-dimensional space,
   i. wherein the marker processing module is configured to compare the determined locations of each of the plurality of markers with the template optical marker data to determine a match,
   ii. wherein the marker processing module is configured to transmit a request signal via the communications circuitry if a match is determined,
   iii. wherein the processor is configured to receive and process vehicle data, comprising characteristics of a vehicle, via the communications circuitry in response to the request signal; and
   a device operation control module, operatively coupled to the processor, wherein the device operation control module is configured to generate one or more control signals based on the processed vehicle data to control the operation of a control device.

2. The system of claim 1, wherein the control device comprises one of a robotic apparatus, a vehicle computer system and a drone operating system.

3. The system of claim 1, wherein the optical sensor comprises a stereoscopic camera apparatus.

4. The system of claim 1, wherein the marker processing module is configured to algorithmically connect each of the determined locations of each of the plurality of markers to form a geometric shape.

5. The system of claim 1, wherein the marker processing module is configured to process individual ones of the plurality of markers using image segmentation to determine marker locations.

6. The system of claim 5, wherein the marker processing module is configured to further process the individual ones of a plurality of markers using a computer vision algorithm to determine marker locations.

7. The system of claim 1, wherein the characteristics of the vehicle comprise locations of vehicle components and/or performance characteristics of the vehicle.

8. A system for operating a control device comprising:
   a processor;
   communications circuitry, operatively coupled to the processor, wherein the communications circuitry is configured to communicate with a computer network;
   a memory, operatively coupled to the processor, the memory being configured to store template radio marker data;
   a radio sensor, operatively coupled to the processor, for receiving radio marker data, wherein the radio marker data comprises data relating to individual ones of a plurality of radio markers, spaced apart from each other in three-dimensional space;
   a marker processing module, operatively coupled to the processor, for processing the radio marker data to determine locations of each of the plurality of radio markers in the three-dimensional space,
   i. wherein the marker processing module is configured to compare the determined locations of each of the plurality of radio markers with the template radio marker data to determine a match,
   ii. wherein the marker processing module is configured to transmit a request signal via the communications circuitry if a match is determined, iii. wherein the processor is configured to receive and process vehicle data, comprising characteristics of a vehicle, via the communications circuitry in response to the request signal; and a device operation control module, operatively coupled to the processor, wherein the device operation control module is configured to generate one or more control signals based on the processed vehicle data to control the operation of a control device.

9. The system of claim 8, wherein the control device comprises one of a robotic apparatus, a vehicle computer system and a drone operating system.

10. The system of claim 8, wherein the radio sensor comprises one or more antennas.

11. The system of claim 8, wherein the marker processing module is configured to algorithmically connect each of the determined locations of each of the plurality of markers to form a geometric shape.

12. The system of claim 8, wherein the marker processing module is configured to process individual ones of the plurality of markers using received signal strength indicator (RSSI) to determine marker locations.

13. The system of claim 12, wherein the marker processing module is configured to further process the individual ones of a plurality of markers using one or more signal propagation models and a localization algorithm to determine marker locations.

14. The system of claim 8, wherein the characteristics of the vehicle comprise locations of vehicle components and/or performance characteristics of the vehicle.

15. A method for operating a control device comprising:
storing, in a memory, template optical marker data;
receiving, via an optical sensor, optical marker data, wherein the optical marker data comprises data relating to individual ones of a plurality of markers, spaced apart from each other in three-dimensional space;
processing, via a marker processing module, the optical marker data to determine locations of each of the plurality of optical markers in the three-dimensional space;
comparing, via the marker processing module, the determined locations of each of the plurality of markers with the template optical marker data to determine a match;
transmitting, via communications circuitry, a request signal if a match is determined;
receiving and processing, via a processor, vehicle data comprising characteristics of a vehicle in response to the request signal; and
generating via a device operation control module, one or more control signals based on the processed vehicle data to control the operation of a control device.

16. The method of claim 15, wherein the generating the one or more control signals comprises generating one or more control signals for one of a robotic apparatus, a vehicle computer system and a drone operating system.

17. The method of claim 15, wherein the optical sensor comprises a stereoscopic camera apparatus.

18. The method of claim 15, wherein processing the optical marker data comprises algorithmically connecting each of the determined locations of each of the plurality of markers to form a geometric shape.

19. The method of claim 15, wherein processing the optical marker data comprises processing the individual ones of a plurality of markers using a computer vision algorithm to determine marker locations.

20. The method of claim 15, wherein the characteristics of the vehicle comprise locations of vehicle components and/or performance characteristics of the vehicle.

* * * * *